United States Patent Office.

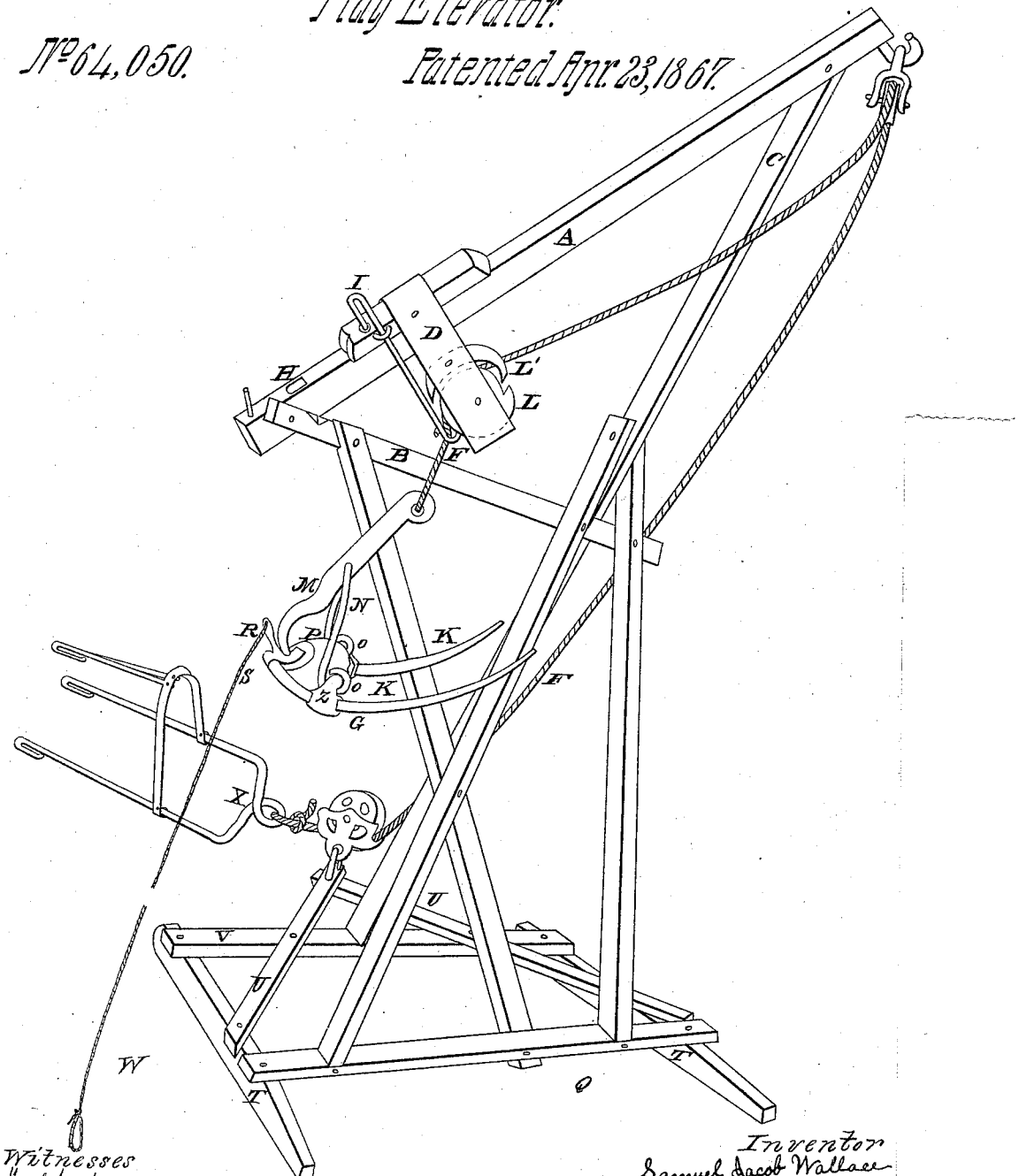

SAMUEL JACOB WALLACE, OF KEOKUK, IOWA.

*Letters Patent No. 64,050, dated April 23, 1867.*

---

HAY STACKER.

---

*The Schedule referred to in these Letters Patent and making part of the same.*

---

TO ALL WHOM IT MAY CONCERN:

Be it known that I, SAMUEL JACOB WALLACE, of Keokuk, in the State of Iowa, have invented a new and useful improvement in Mechanism for Stacking Hay and like products; and I hereby declare the following to be a full, clear, and exact description thereof, reference being had to the accompanying drawings, and to the letters of reference marked thereon, in which—

Figure 1 is a perspective elevation of mechanism for stacking containing my improvements.

The object of this invention is to raise and move hay or other products from a load to a point for stacking on a stack or in a mow by horse power. And to do this, my invention consists of the apparatus made as shown in the drawings, which consists of several elements well known, together with others new, and the whole subjected to more or less improvement to adapt it to the work, as hereinafter set forth.

A single suspended and inclined stiff way, A, is made in and supported by the frame of a portable stacking machine, as shown, for the carrier D which carries the fork G to run up and down, back and forth on, in pitching on to the stack; the same device being used also in barns. This way A is made single, and is supported toward the ends on one side by the arms B C of the stacker-frame, so as to leave the top side, the top part of one side, and the whole of the other side free for the passage of the carrier D. A carrier, D, is made to run on a single way, A. The top of this carrier D is made to saddle and extend down a little on the sides of way A, so as to ride it. And directly under the way A, is a pulley, L, on the carrier D, to carry the fork rope F, and between the top and bottom parts of carrier D there is a connection on one side of the way A, only to enable the way A to receive intermediate supports B C on one side opposite, while the carrier D can pass them as freely as where double ways have been used heretofore. A stop on the down passage of the fork rope F from the carrier D, when the carrier is bearing the loaded fork G, and the same is inclined by the weight of the load to run faster than the rope F is drawn by the horse, and so let the fork G descend in place of rising, is made in this way: The groove in the pulley-sheave L is made somewhat narrowing to the bottom so as to tighten on the rope F when drawn down by the weight and act as a brake, and the pulley L has a catch cut in its rim at L', and a pawl or latch falling into it, which is made so that the pulley L is free to turn to let the rope pass up, but is locked from turning backward to let the rope descend, so as to carry the fork more surely up or along as the rope is drawn than those used heretofore. The elevating fork used is formed by casting the head part Z on to the tines K K, with eyes O O for the hooks of the bail N, which connect it with the handle M, through which it passes, and supports the load on the projecting tines K K by the handle part M, and the tines K K extending back behind the head Z and the bail N, and meeting so as to act as bracing levers for that purpose, while the whole is suspended by rope F at the end of handle M; the trip part R being used to trip the two ends apart and break the connection and bracing so as to drop the load, when the cord S is drawn and the load has reached the proper point. The single handle part M is made and used for both elevating with the rope F, and for use as a handle in pitching by hand. The ends of the tines K K are joined and extended back from the head part Z to be used as a brace for handle M in supporting the load on the tines, thus simplifying the construction and parts required. A portable stacker is made, as shown, and has the cross-braces U U applied to its base, so as to strengthen its frame, and enable it to be turned to better advantage when moving. This system of cross-bracing is made of the pieces U U reaching from the two sides or runners T T, back and across the back cross-piece of the base and joined at their back ends, and fastened at each joint, which makes a better frame, although it can be made without the crossing of the bracing parts. A stiff tugged or shafted single-tree, X, is made as shown, all of one piece or its equivalent, to be worn by the horse used to elevate the loaded fork G, being supported in a suitable way, and is used to hold up the end of the rope F in backing, turning, and moving to and fro, giving more freedom and celerity of movement, and to keep the horse's feet from being struck by the ordinary single-trees in stacking. The hay is raised from the load on side W, and carried up and across and dropped on to the stack on side Q, by the horse pulling on rope F, passing through the pulleys or rings as shown; being caused to drop by the pulling of the trip rope S, which trips the handle and tines apart by the action of the trip R, when the carrier D runs back down way A with the fork G to the load on the return of the horse.

What I claim, is—

A portable hay stacker having the several parts thereof, constructed, arranged, and combined as and for the purpose set forth.

SAMUEL JACOB WALLACE.

Witnesses:
B. S. MORRISON,
HUGH MARTIN.